United States Patent
Herden et al.

(10) Patent No.: US 8,435,807 B2
(45) Date of Patent: May 7, 2013

(54) METHOD FOR MANUFACTURING A SOLID STATE LASER HAVING A PASSIVE Q-SWITCH

(75) Inventors: Werner Herden, Gerlingen (DE); Heiko Ridderbusch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 403 days.

(21) Appl. No.: 12/733,550

(22) PCT Filed: Jul. 22, 2008

(86) PCT No.: PCT/EP2008/059600
§ 371 (c)(1),
(2), (4) Date: Jun. 30, 2010

(87) PCT Pub. No.: WO2009/037035
PCT Pub. Date: Mar. 26, 2009

(65) Prior Publication Data
US 2010/0285619 A1    Nov. 11, 2010

(30) Foreign Application Priority Data

Sep. 14, 2007    (DE) .......................... 10 2007 044 007

(51) Int. Cl.
*H01L 21/00*    (2006.01)
(52) U.S. Cl.
USPC ................... 438/27; 438/33; 438/45; 438/46; 257/E33.068; 257/E21.028; 257/E21.134; 372/10; 372/17
(58) Field of Classification Search ............. 257/777, 257/E23.061, E33.068, E21.028, E21.134; 327/50, 75; 438/404, 464, 460, 462, 27, 438/33, 45–46, 463, 662; 372/10, 17
See application file for complete search history.

(56) References Cited

U.S. PATENT DOCUMENTS

| | | | |
|---|---|---|---|
| 5,593,620 A | 1/1997 | Galas | |
| 6,107,163 A | 8/2000 | Kojima et al. | |
| 7,149,231 B2 | 12/2006 | Afzal et al. | |
| 7,170,183 B1 * | 1/2007 | Kim et al. ................... | 257/777 |
| 7,820,526 B2 * | 10/2010 | Yamada et al. ............... | 438/458 |
| 8,075,647 B2 * | 12/2011 | Kawasaki et al. ............... | 51/307 |
| 2004/0045589 A1 * | 3/2004 | Holsteyns et al. .............. | 134/32 |
| 2004/0066805 A1 | 4/2004 | Afzal et al. | |
| 2005/0063441 A1 * | 3/2005 | Brown ............. | 372/50 |
| 2008/0000772 A1 * | 1/2008 | Bazant et al. ................. | 204/450 |

FOREIGN PATENT DOCUMENTS

| | | |
|---|---|---|
| DE | 10 2006 924 678 | 12/2006 |
| WO | WO 90/09688 | 8/1990 |

* cited by examiner

*Primary Examiner* — Evan Pert
*Assistant Examiner* — Mark A Laurenzi
(74) *Attorney, Agent, or Firm* — Kenyon & Kenyon LLP

(57) ABSTRACT

A method for manufacturing a laser-active solid having a bonded passive Q-switch is provided. A plane-parallel first wafer plate may be manufactured from a laser-active material. A second plane-parallel wafer plate may be manufactured from a material that is suitable as a passive Q-switch. The first wafer plate and the second wafer plate may be bonded to form a wafer block, which may then be coated on both end faces with a resonator mirror. Subsequently, the wafer block may be separated into multiple passively Q-switched solid state lasers.

15 Claims, 3 Drawing Sheets

METHOD FOR MANUFACTURING A SOLID STATE LASER HAVING A PASSIVE Q-SWITCH

BACKGROUND OF THE INVENTION

1. Field of the Invention

The present invention relates to a solid state laser for use in a laser device of a so-called laser ignition for internal combustion engines.

2. Description of Related Art

In these laser ignitions, the spark plug is replaced by an ignition laser, which is able to emit a focused laser pulse into the combustion chamber of the internal combustion engine. In the focus of this laser beam, the so-called ignition point, the energy density is so high that the combustion gas-air mixture present there is ignited.

Since internal combustion engines for motor vehicles are manufactured in very great quantities, the economical manufacture of these laser ignitions is of great importance.

SUMMARY OF THE INVENTION

The present invention is based on the objective of providing a method for manufacturing a solid state laser having a passive Q-switch, which allows for the economical manufacture of large quantities of solid state lasers.

According to the present invention, this objective is achieved by a method, in which a plane-parallel first wafer plate is manufactured from a laser-active material, subsequently a second plane-parallel wafer plate is manufactured from a material that is suitable as a passive Q-switch, and the first wafer plate and the second wafer plate are bonded to form a wafer block. This wafer block may then be coated on both end faces with a resonator mirror. Subsequently, this wafer block is separated into multiple passively Q-switched solid state lasers using a wire saw.

The method of the present invention has the advantage that the solid state lasers and the passive Q-switches are not bonded or connected individually, but rather an entire first wafer plate and an entire second wafer plate are bonded respectively. From these wafer block thus formed, it is now possible to saw out a multitude of laser-active solids having passive Q-switches such that the economy is already considerably increased due to the marked reduction of the number of bonding processes.

The present invention furthermore provides for the wafer block to be separated into a multitude of laser-active solids having passive Q-witches by using a wire saw. Such a wire saw comprises a continuous wire or a continuous wire cable that is run over and driven by pulleys. The required separating process is performed with the aid of the wire or the wire cable.

In order to increase the separating effect of the wire or wire cable, the wire cable may be studded with diamond powder or small shards of industrial diamonds. Alternatively, it is also possible to guide the wire through a slurry before it reaches the cutting location, the slurry containing grinding or cutting means such a silicon carbide and/or bort. This slurry adheres to the wire or wire cable and thereby enters the cutting slot. There the cutting means contained in the slurry contribute toward an effective and quick separation of the wafer block into a multitude of laser-active solids having passive Q-switches.

In order to achieve the highest possible quality of connection between the first wafer plate and the second wafer plate, the contact surfaces of the first wafer plate and the second wafer plate are cleaned of all impurities prior to bonding. Preferably, this may be done using a mixture of sulfuric acid and hydrogen peroxide.

Subsequently, the contact surfaces of the first wafer plate and the second wafer plate may be etched prior to bonding and then rendered hydrophilic using diluted sulfuric acid having a pH value of 1, for example. The contact surfaces may be cleaned using a plasma-assisted dry etching method (plasma etching) for example.

If required, at least the contact surfaces of the first wafer plate and the second wafer plate are rinsed at least once between the different cleaning steps using ultra-pure water.

If required, all processes may be carried out at increased temperature in order to intensify the cleaning or the etching effect.

The bonding process itself occurs in that the first wafer plate and the second wafer plate are pressed against each other by light pressure and are then heated for a period at temperatures of 1100° C. for example. This brings about a diffusion of the molecules of the first wafer plate and the second wafer plate and results in an intimate connection of the two wafer plates without the formation of visible boundary layer between the first wafer plate and the second wafer plate. The bonding process may take up to 48 hours.

It is possible to achieve a further increase in the economy of the method of the present invention if multiple wire saws are simultaneously arranged side-by-side such that by two cuts, that is, one cut in the direction of an X axis and a second cut in the direction of a Y axis, a wafer block may be separated or taken apart into a multitude of laser-active solids having a passive Q-switch.

The economy of the separation process may be increased further if multiple wafer blocks are stacked on top of each other and this stack is then divided using one or multiple wire saws. In order to protect the previously vapor-deposited mirror layers, it is further recommendable to protect the end faces of the wafer blocks by a protective layer, such as an adhesive protective film for example, particularly against mechanical damage. In addition, the protective film holds together the wafer blocks that are partially sawed apart, which substantially facilitates handling.

Additional advantages and advantageous developments of the present invention may be found in the subsequent drawing, its description and the claims. All of the features described and disclosed in the drawing, its description and the claims may be essential to the present invention both individually and in any combination.

DETAILED DESCRIPTION OF THE INVENTION

Figure 1A:
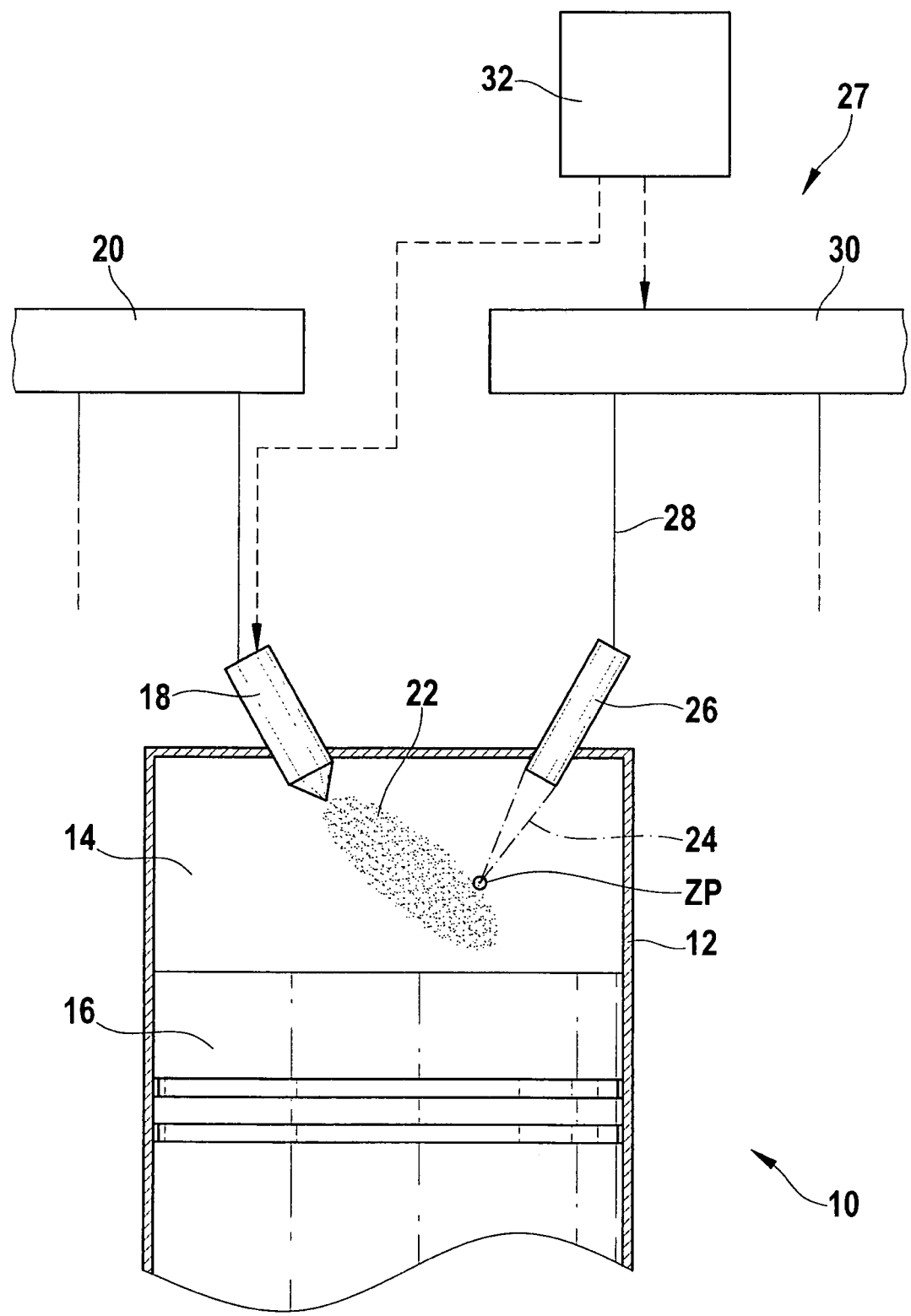
FIG. 1a shows a schematic representation of an internal combustion engine having a laser-based ignition device.

In FIG. 1a, reference numeral 10 designates an internal combustion engine as a whole. It may be used to drive a motor vehicle (not shown). Alternatively, internal combustion engine 10 may of course also be used in a stationary application. Internal combustion engine 10 comprises multiple cylinders, only one of which is indicated in FIG. 1 by reference numeral 12. A combustion chamber 14 of cylinder 12 is bounded by a piston 16. Fuel reaches combustion chamber 14 directly through an injector 18, which is connected to a fuel pressure reservoir 20 that is also referred to as a rail.

Fuel 22 injected into combustion chamber 14 is ignited by a laser pulse 24, which is eradiated into combustion chamber 14 by an ignition device 27 that includes an ignition laser 26. For this purpose, an light guide device 28 feeds ignition laser 26 with a pumping light provided by a pumping light source 30. Pumping light source 30 is controlled by a control unit 32, which also controls injector 18.

Figure 1B:
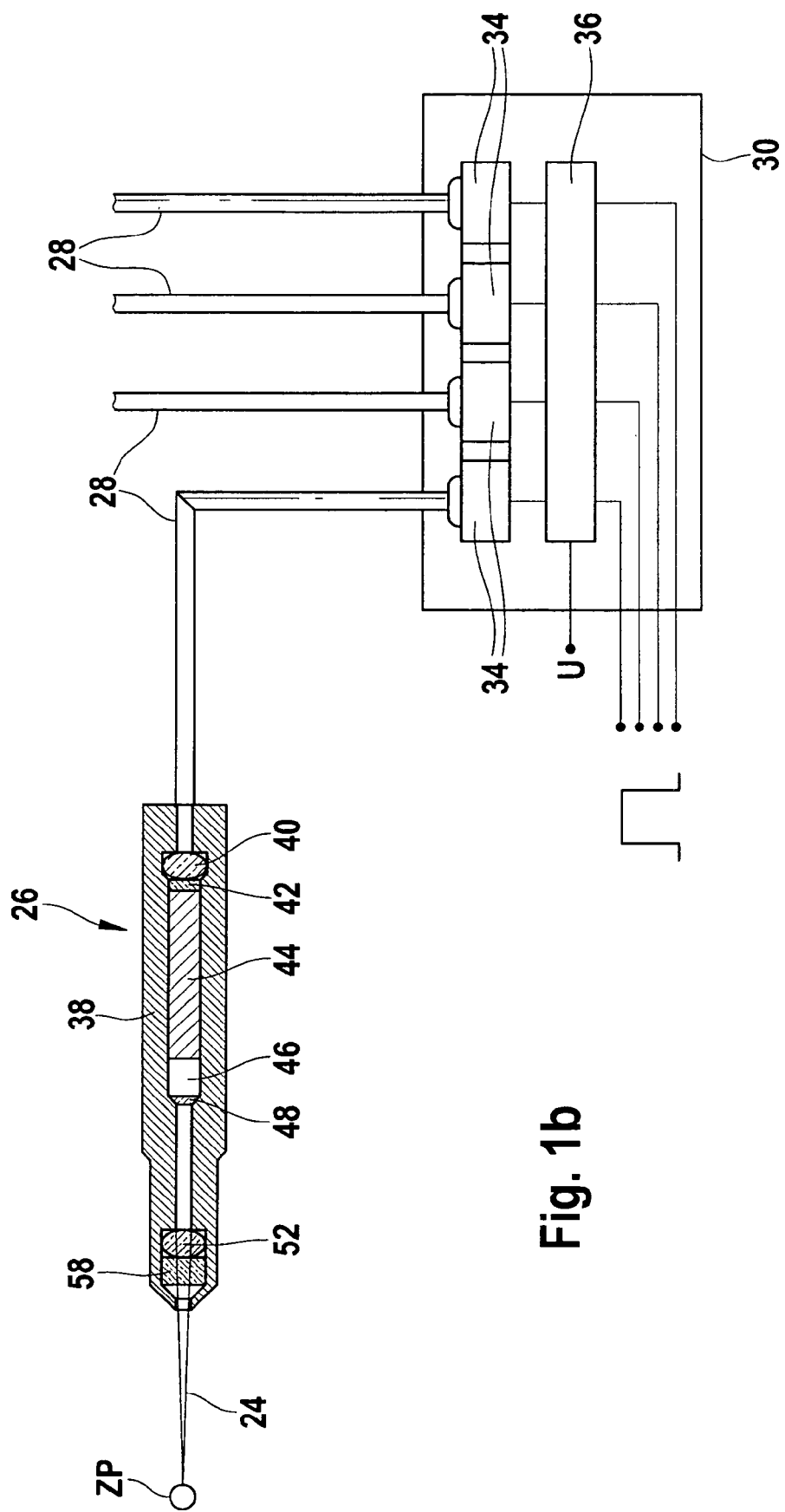
FIG. 1b shows a schematic representation of the ignition device from FIG. 1.

As may be gathered from FIG. 1b, pumping light source 30 feeds multiple light guide devices 28 for different ignition lasers 26, which are respectively associated with one cylinder 12 of internal combustion engine 10. Toward this end, pumping light source 30 has multiple individual laser light sources 34, which are connected to a pulsed current supply 36. Because of the presence of the plurality of individual laser light sources 340, a quasi "latent" distribution of pumping light to the various ignition lasers 26 is achieved such that no optical distributors or the like are required between pumping light source 30 and ignition lasers 26.

Ignition laser 26 has, for example, a laser-active solid 44 having a passive Q-switch 46, which in conjunction with a coupling mirror 42 and decoupling mirror 48 forms an optical resonator. When supplied with pumping light generated by pumping light source 30, ignition laser 26 generates a laser pulse 24 in a manner known per se, which is focused by focusing optics 52 on an ignition point ZP situated in combustion chamber 14 (FIG. 1a). The components located in housing 38 of ignition laser 26 are separated from combustion chamber 14 by a combustion chamber window 58.

Figure 2:
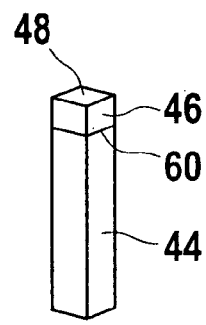
FIG. 2 shows a laser-active solid 44 manufactured according to the method of the present invention having a passive Q-switch 46.

In an isometric view, FIG. 2 shows a laser-active solid 44 having a passive Q-switch 46, which was manufactured according to the method of the present invention. Coupling mirror 42 (see FIG. 1b) is not visible in FIG. 2. The boundary between laser-active solid 44 and passive Q-switch 46 is indicated by a line 60. With respect to its optical properties, the interface indicated by line 60 is to impair the emission of the laser pulse through decoupling mirror 48 of passive Q-switch 46 as little as possible.

Figure 3:
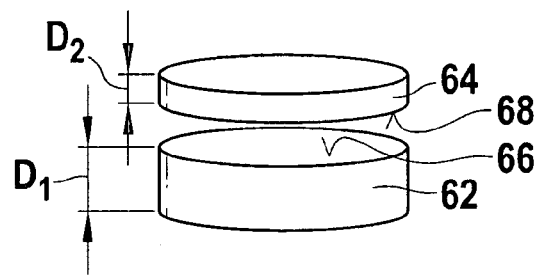
FIGS. 3-5 show various processing stages of the method of the present invention.

FIG. 3 shows a first wafer plate 62 and a second wafer plate 64 in a side view. First wafer plate 62 is made of a laser-active material, while second wafer plate 64 forms passive Q-switch 46 (see FIG. 2). The contact surfaces of first wafer plate 62 and second wafer plate 64 are indicated by reference numerals 66 and 68.

First wafer plate 62 and second wafer plate 64 are bonded to each other on contact surfaces 66 and 68. For this purpose, it is necessary that these contact surfaces 66 and 68 are very even and free of any impurities. This is achieved by various cleaning steps, etching and rendering the surfaces hydrophilic, as was already explained in detail in connection with Claims 2 ff in the introduction of the description.

Figure 4:
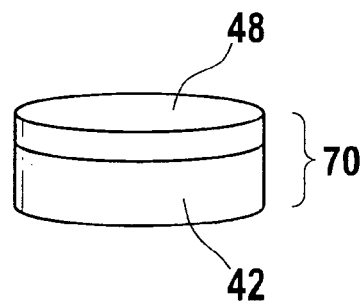

Once contact surfaces 66 and 68 have been prepared accordingly, first wafer plate 62 and second wafer plate 64 are placed one upon the other and pressed against each other. Through a subsequent heat treatment, at 1100° C. for example, which may last up to fifty hours, first wafer plate 62 and second wafer plate 64 bond on their contact surfaces 66 and 68 by diffusion. In FIG. 4, the resulting wafer block is provided with the reference numeral 70.

Subsequently, the end faces of wafer block 70 are coated with a coupling mirror 42 and a decoupling mirror 48. The fact that wafer block 70 is coated prior to being divided into different laser-active solids 44 results in a substantial rise in productivity.

Figure 5:
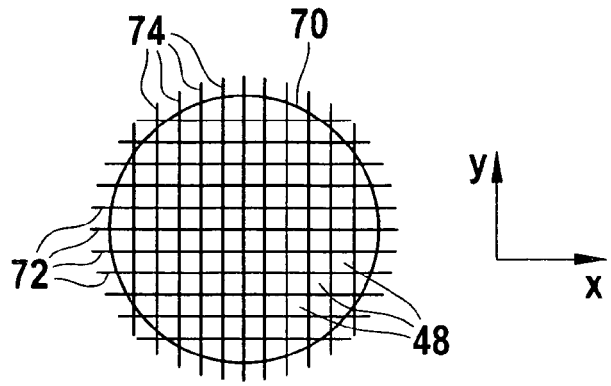

FIG. 5 shows a top view of a wafer block 70 manufactured according to the method of the present invention. At the same time, sectional lines 72 and 74 are drawn in as well. The sectional lines running in parallel to the X axis are in part provided with reference numerals 72, while the sectional lines running in the direction of the Y axis are provided in part with reference numerals 74.

In order to separate, as economically as possible, wafer block 70 into a multitude of laser-active solids 44 having a bonded passive Q-switch 46, wafer block 70 is divided into multiple strips by multiple wire saws (not shown) disposed in parallel in one first cut in the direction of the X axis. Subsequently, these strips are divided by a second cut using multiple wire saws disposed in parallel in the direction of the Y axis into the laser-active solids 44, shown in FIG. 2, having bonded passive Q-switch 46.

The wire sawing process has proved to be extraordinarily economical, both when using one wire saw as well as when using multiple wire saws disposed in parallel. As a result, the method according to the present invention achieves a significant increase in productivity and thus a significant reduction in manufacturing costs.

What is claimed is:

1. A method for manufacturing a passively Q-switched solid state laser comprising:
    manufacturing a plane-parallel first wafer plate from a laser-active material,
    manufacturing a plane-parallel second wafer plate from a material that is suitable as a passive Q-switch,
    treating respective contact surfaces of the first wafer plate and of the second wafer plate with diluted sulfuric acid ($H_2SO_4$) rendering the contact surfaces hydrophilic prior to bonding,
    bonding the first wafer plate and the second wafer plate to form a wafer block, and
    separating the wafer block into multiple passively Q-switched solid state lasers using a wire saw.

2. The method as recited in claim 1, wherein the contact surfaces of the first wafer plate and of the second wafer plate are cleaned prior to bonding, using a mixture of sulfuric acid (H2SO4) and hydrogen peroxide (H2O2).

3. The method as recited in claim 1, wherein the contact surfaces of the first wafer plate and the second wafer plate are etched prior to bonding.

4. The method as recited in claim 2, wherein prior to bonding, the contact surfaces of the first wafer plate and of the second wafer plate are rinsed at least once using ultra-pure water.

5. The method as recited in claim 1, wherein a first end face of the wafer block is coated with a coupling mirror.

6. The method as recited in claim 1, wherein a second end face of the wafer block is coated with a decoupling mirror.

7. The method as recited in claim 5, wherein a second end face of the wafer block is coated with a decoupling mirror.

8. The method as recited in claim 1, wherein multiple bonded wafer blocks are stacked one upon the other and these wafer blocks are subsequently separated into multiple solid state lasers.

9. The method as recited in claim 8, wherein at least one of the first and the second end face of the wafer blocks are protected by an adhesive film protective layer prior to being stacked.

10. The method as recited in claim 1, wherein the wafer block is separated by multiple wire saws disposed in parallel to one another.

11. The method as recited in claim 1, wherein sawing wires of the wire saw have diamond powder as a cutting means.

12. The method as recited in claim 1, wherein sawing wires of the wire saw have silicon carbide as a cutting means.

13. The method as recited in claim 11, wherein prior to cutting, the sawing wires of the wire saw are drawn through a slurry, and the slurry contains the cutting means in powder form.

14. The method as recited in claim 11, wherein the sawing wires of the wire saw are coated with the cutting means.

15. The method as recited in claim 1, wherein the diluted sulfuric acid has a pH value of 1.

\* \* \* \* \*

UNITED STATES PATENT AND TRADEMARK OFFICE
CERTIFICATE OF CORRECTION

PATENT NO.      : 8,435,807 B2                                          Page 1 of 1
APPLICATION NO. : 12/733550
DATED           : May 7, 2013
INVENTOR(S)     : Herden et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Eighth Day of September, 2015

Michelle K. Lee
*Director of the United States Patent and Trademark Office*